United States Patent Office 3,150,170
Patented Sept. 22, 1964

3,150,170
BENZOYLMETHYLENEIMINOBENZOIC ACID DERIVATIVES
Guido Cavallini and Elena Massarani, Milan, Italy, assignors to Francesco Vismara S.p.A., Casatenovo (Como), Italy
No Drawing. Filed Feb. 10, 1961, Ser. No. 88,298
Claims priority, application Italy, Apr. 29, 1960, 7,607/60; June 15, 1960, 10,639/60; Germany, Sept. 19, 1960, V 19,370; Italy, Jan. 31, 1961, 1,697/61
10 Claims. (Cl. 260—518)

This invention relates to novel benzoylmethyleneiminobenzoic acid derivatives having antiviral activity and to a method for their preparation.

More specifically, the novel compounds of this invention have activity against distemper virus, influenza virus (PR8), hepatitis virus (MHV₃), neurotropic virus (CLM), herpes simplex, adenovirus, Newcastle disease virus, Coxsackie virus, Echo virus and hemadsorption virus. Activity against the first four mentioned viral entities is exceptionally pronounced.

The benzoylmethyleneiminobenzoic acid derivatives of this invention are represented by the following basic structural formula:

(Formula I)

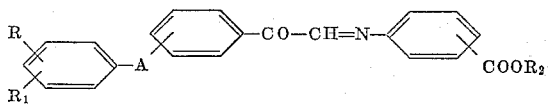

when:

R represents hydrogen, halogen such as chlorine, bromine or fluorine, hydroxy, lower alkoxy of 1 to 4 carbon atoms inclusive, lower alkyl of 1 to 4 carbon atoms inclusive or benzyloxy;

$R_1$ represents hydrogen or halogen such as chlorine, bromine or fluorine;

$R_2$ represents hydrogen or lower alkyl of 1 to 4 carbon atoms; and

A represents oxygen, sulfur, sulfonyl, sulfinyl (SO), methylene ($CH_2$), ethylene ($CH_2CH_2$), $\alpha,\beta$-diethyl ethylene, vinylene ($CH=CH$), $\alpha,\beta$-diethyl vinylene or a single direct valence bond.

Advantageous compounds of this invention are represented by the following general formula:

(Formula II)

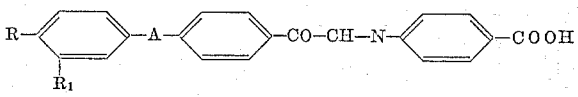

when:

R represents hydrogen, halogen of atomic weight less than 80, hydroxy, methoxy or ethoxy; and $R_1$ represents hydrogen or halogen of atomic weight less than 80; and A represents a single direct valence bond, oxygen, sulfur, ethylene, vinylene or sulfonyl.

Preferred compounds of this invention are represented by Formula II when:

R represents hydrogen, hydroxy or methoxy; and
$R_1$ represents hydrogen or chlorine.

A particularly preferred and advantageous compound is 4-(4-phenylbenzoylmethyleneimino)benzoic acid.

The compounds of this invention are prepared by a novel decomposition (dehydration or dealcoholation) of $\alpha$-phenylbenzoyl-$\alpha$-arylaminocarbinol derivatives having the following formula:

(Formula III)

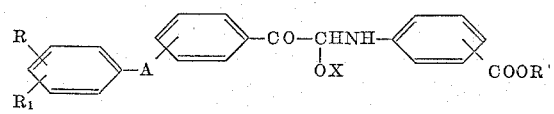

in which R, $R_1$, $R_2$ and A are as previously defined in Formula I and X is hydrogen or lower alkyl of 1 to 4 carbon atoms.

The novel decomposition (dehydration or dealcoholation) of the compounds of Formula III is accomplished by heating to a temperature of about 70–140° C. preferably under reduced pressure of about 0.01–15 mm. of mercury. The reaction is preferably run in the absence of solvent and in an anhydrous atmosphere. Where the ether of the carbinol is used a molecule of alcohol is eliminated; where the carbinol itself is used a molecule of water is eliminated.

The time necessary for the elimination of water or alcohol from the carbinol depends entirely on the amount of carbinol to be dehydrated and on the temperature and pressure used. In general at a temperature of from about 100–120° C. and a pressure of 0.1–15 mm. of mercury the reaction is complete and a pure product is obtained in about 1–10 hours.

Advantageously the novel dehydration or dealcoholation is carried out by subjecting the compounds of Formula III to a beam of infrared rays. In general for the source of lumination 300–450 watt lamps are used, maintained at a distance of from about 10–20 cm. from the product. The temperature of the layer of product is maintained at from about 100–150° C., for example by means of a resistance thermometer in series with the lamps. The duration of heating is generally about 2–6 hours, but is of course dependent on the amount of substance and other technical factors. The yield is quantitative and the product obtained is pure. This method is particularly preferred because of its adaptability for industrial manufacture and the advantage of operating at atmospheric pressure.

The $\alpha$-benzoyl-$\alpha$-arylaminocarbinol intermediates of Formula III are prepared by condensing either the alcoholate (hemiacetal) or hydrate addition compounds of an aryl glyoxal having the following formula:

(Formula IV)

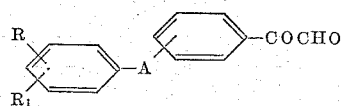

in which R, $R_1$ and A are as defined above for Formula I, with an aminobenzoic acid derivative with elimination of one mole of water. This reaction is carried out using approximately molar equivalent amounts of the addition compound and the aminobenzoic acid in an inert organic solvent in which the reactants are substantially soluble at from about 25° C. up to the boiling point of the solvent employed for periods of about 15 minutes to about 24 hours.

The starting material aryl glyoxal hydrate or alcoholate addition compounds of Formula IV above are prepared by reacting the glyoxal with water or an alcohol at about 25–100° C. in an inert organic solvent in which the reactants are substantially soluble such as a lower alcohol, an aryl solvent such as benzene or toluene, ethers or halogenated alkane solvents. The aryl glyoxal starting materials are either known per se or are prepared from easily available acetophenone derivatives by oxidation such as with selenium dioxide. The corresponding acetophenone compounds are generally well known in the prior art. In the rare instances in which they are not, a Friedel-Crafts acylation with acetyl chloride under standard conditions is easily carried out. Also, corresponding dihalogenacetyl derivatives are treated with an alkaline alcoholate and the resulting acetal hydrolyzed with acid to give the glyoxal derivatives.

The following examples are not limiting but are designed to illustrate the novel aspects of this invention fully and to enable one skilled in the art to practice this invention.

*Example 1*

A mixture of 7.5 g. of anhydrous biphenylyl-4-glyoxal in 60 cc. of anhydrous methyl alcohol is heated at 60° C. with stirring until clear. Cooling separates the methylate, M.P. 95–96° C.

A solution of 4.8 g. of the methylate and 2.8 g. of p-aminobenzoic acid in 60 cc. of methanol is heated at 60° C. for 4 hours. Cooling separates the desired methyl ether of α-(p-phenylbenzoyl)-α-4-carboxyphenylamino)carbinol, M.P. 192–194° C.

This carbinol (0.8 g.) is placed is a desiccator pistol containing carbon tetrachloride. The apparatus is evacuated to about 0.1 mm. of mercury and the solvent refluxed until the product is at constant weight. After 15 hours, 4-(p-phenylbenzoylmethyleneimino)benzoic acid is obtained.

*Example 2*

A mixture of 7.75 g. of selenium dioxide, 2 cc. of water and 20 cc. of dioxan is heated to 70° C. while a solution of 11.13 g. of 4-acetyl-4'-methoxybiphenyl in 60 cc. of dioxan is added dropwise. The mixture is heated at reflux for 5 hours, then filtered hot and partially evaporated. Cooling separates 4'-methoxybiphenylyl-4-glyoxal, M.P. 136–137° C.

A mixture of 8.0 g. of the glyoxal in 100 cc. of absolute ethyl alcohol is heated at reflux for several hours. The clear solution is evaporated slightly then cooled to give the desired ethylate.

The ethylate (2.9 g.) and 1.45 g. of p-aminobenzoic acid in 50 cc. of absolute ethyl alcohol is heated at reflux for 5 hours. After slight evaporation, the solution is cooled to separate the desired ethyl ether of α-(p-4-methoxyphenylbenzoyl)-α-(4 - carboxyphenylamino)carbinol, M.P. 224° C.

One gram of α-(p-4-methoxyphenylbenzoyl)-α-(4-carboxyphenylamino)carbinol is heated at 100° C. at 1 mm. of mercury for eight hours to give 4-(p-4-methoxyphenylbenzoylmethyleneimino)benzoic acid.

*Example 3*

A mixture of 3.9 g. of selenium dioxide and 15 cc. of aqueous dioxan is reacted with 6.5 g. of 4'-acetyl-3-chloro-4-methoxybiphenyl (prepared by reacting acetyl chloride with 3-chloro-4-methoxybiphenyl under Friedel-Crafts conditions) in 40 cc. of dioxane as described in Example 2 to give the glyoxal as the hydrate, M.P. 141–142° C. This compound (5.5 g.) is reacted with 2.8 g. of p-aminobenzoic acid in benzene to give α-(p-3-chloro-4-methoxyphenylbenzoyl)-α-(4-carboxyphenylamino)carbinol after warming on the steam bath for 1 hour.

Heating this carbinol at 100° C. (1 mm.) for ten hours yields 4-(p-3-chloro-4-methoxyphenylbenzoylmethyleneimino)benzoic acid.

*Example 4*

A solution of 4.5 g. of 4'-hydroxybiphenylyl-4-glyoxal in 50 cc. of anhydrous ethyl alcohol is heated at reflux until clear. p-Aminobenzoic acid (2.8 g.) is then added to the crude ethylate solution and the heating period extended for several hours. Cooling separates the ethyl ether of α-(p-4-hydroxyphenylbenzoyl)-α-(4-carboxyphenylamino)carbinol, M.P. 216–217° C.

Two grams of this carbinol is heated at 90° C. at 0.5 mm. of mercury. After six hours, pure 4(p-4-hydroxyphenylbenzoylmethyleneimino)benzoic acid is obtained.

*Example 5*

A solution of 13.5 g. of 4-acetyl-3'-bromobiphenyl and 7.75 g. of selenium dioxide in dioxane is heated at reflux for several hours. After filtration, the hot solution is cooled to separate the desired 3'-bromodiphenylyl-4-glyoxal. This compound (6.4 g.) is reacted with 30 cc. of anhydrous methyl alcohol to give the methylate (5.4 g.) which is reacted with 2.8 g. of p-aminobenzoic acid in 50 cc. of methyl alcohol at reflux for 6 hours. Cooling separates the methyl ether of α-(p-3-bromophenylbenzoyl)-α-(4-carboxyphenylamino)carbinol.

This carbinol is heated at 75° C. for 15 hours to give 4-(p-3-bromophenylbenzoylmethyleneimino)benzoic acid.

*Example 6*

A solution of 12.4 g. of 4-acetyl-4'-tert.-butylbiphenyl (prepared by the reaction of acetyl chloride with 4-tert.-butylbiphenyl under Friedel-Crafts conditions) is heated with 7.8 g. of selenium dioxide in dioxane for several hours as in Example 2. The free selenium is separated by filtration and the glyoxal separated from the solvent. The glyoxal (5 g.) is heated with 26 cc. absolute methanol to give the methylate. This compound is then reacted with an equivalent amount of p-aminobenzoic acid in benzene as in Example 2 to give the desired methyl ether of α-(p-4-tert.-butylphenylbenzoyl)-α-(4-carboxyphenylamino)carbinol.

This carbinol is heated in a desiccator pistol at 100° C. (0.2 mm.) until there is no further loss of weight. 4(p-4 - tert. - butylphenylbenzoylmethyleneimino)benzoic acid is the product.

*Example 7*

A mixture of 11.4 g. of 4-acetyl-3'-chloro-2'-methylbiphenyl (prepared by the Friedel-Crafts reaction as in Example 6) and 7 g. of selenium dioxide in dioxane is heated for several hours. The product, isolated as in Example 2, is 3'-chloro - 2' - methylbiphenylyl-4-glyoxal. This compound (5.5 g.) is heated in 75 cc. of methyl alcohol for several hours then 2.8 g. of p-aminobenzoic acid is added to the alcoholic solution of the methylate compound and the reflux period continued. Cooling the filtered solution gives the methyl ether of α-(p-3-chloro-2-methylphenylbenzoyl) - α - (4 - carboxyphenylamino) carbinol.

Heating this α-(p-3-chloro-2-methylphenylbenzoyl)-α-(4-carboxyphenylamino)-carbinol at 110° C. (1 mm.) for eight hours yields 4-(p-3-chloro-2-methylphenylbenzoylmethyleneimino)benzoic acid.

*Example 8*

A solution of 5.4 g. of 4'-benzyloxybiphenylyl-4-glyoxal (prepared by reacting 4-hydroxybiphenyl with benzyl chloride under standard alkylation conditions, acetylating under Friedel-Crafts conditions and oxidizing with selenium dioxide as in Example 3) in 75 cc. of ethyl alcohol is heated at 60° C. for 5 hours. Then an equimolar amount of p-aminobenzoic acid is added to the ethylate while the heating is resumed. Concentration gives the desired product, the ethyl ether of α-(p-4-benzyloxyphenylbenzoyl)-α-(4-carboxyphenylamino)carbinol.

When this carbinol is dehydrated by heating at 100° C. at 1 mm. of mercury for ten hours, 4-(p-4-benzyloxyphenylbenzoylmethyleneimino)benzoic acid is obtained.

*Example 9*

A solution of 5.4 g. of 3',4'-dichlorobiphenylyl-4-glyoxal (prepared by Friedel-Crafts reaction on 4-acetyl-3',4'-dichlorobiphenyl followed by selenium dioxide oxidation in dioxan as in Example 2) in 100 cc. of methyl alcohol is heated at 60° C. for 4 hours. The product which crystallizes upon evaporation and cooling is the methylate. This compound (2.9 g.) is reacted in methyl alcohol with 1.4 g. of p-aminobenzoic acid at reflux for 2 hours. Cooling separates the methyl ether of α-(p-3,4-dichlorophenylbenzoyl) - α - (4 - carboxyphenylamino)carbinol.

This carbinol is heated at 120° C. (1 mm.) for six hours to furnish 4-(p-3,4-dichlorophenylbenzoylmethyleneimino)benzoic acid.

*Example 10*

A solution of 2.4 g. of the methylate of biphenylyl-4-glyoxal (prepared as in Example 1) and 1.4 g. of m-aminobenzoic acid in 30 cc. of methanol is heated at 60° C. for five hours. Cooling separates the methyl ether of α-(p-phenylbenzoyl)-α-(3-carboxyphenylamino)carbinol which is heated at 100° C. (1 mm.) for 10 hours to give 3-(p-phenylbenzoylmethyleneimino)benzoic acid.

*Example 11*

A solution of 3.7 g. of biphenylyl-2-glyoxal is reacted with 50 cc. of methyl alcohol and then with 2.5 g. of p-aminobenzoic acid as in Example 1 to give the methyl ether of α-(o-phenylbenzoyl)-α-(4-carboxyphenylamino)carbinol.

Heating this carbinol at 100° C. (0.5 mm.) for eight hours gives 4-(o-phenylbenzoylmethyleneimino)benzoic acid.

*Example 12*

A solution of 2.4 g. of the methylate of biphenylyl-2-glyoxal (prepared by heating biphenylyl-2-glyoxal in anhydrous methanol at 60° C.) and 1.9 g. of butyl p-aminobenzoate is heated at 60° C. for five hours. Cooling separates the methyl ether of α-(o-phenylbenzoyl)-α-(4-butoxycarbonylphenylamino)carbinol.

When this carbinol is heated at about 100° C. at 1 mm. of mercury for eight hours, the butyl ester of 4-(o-phenylbenzoylmethyleneimino)benzoic acid is obtained.

*Example 13*

A solution of 7.2 g. of biphenylyl-3-glyoxal is reacted with 100 cc. of methanol and the resulting methylate is heated with 5.0 g. of p-aminobenzoic acid for five hours to separate the methyl ether of α-(m-phenylbenzoyl)-α-(4-carboxyphenylamino)carbinol.

This carbinol is heated at 100° C. at 1 mm. of mercury until there is no further loss of weight. 4-(m-phenylbenzoylmethyleneimino)benzoic acid is obtained.

*Example 14*

Four grams of the methylate of biphenylyl-4-glyoxal (prepared as in Example 1) and 2.5 g. of methyl p-aminobenzoate in 50 cc. of methanol are refluxed for four hours. Cooling separates the methyl ether of α-(p-phenylbenzoyl) - α - (4 - methoxycarbonylphenylamino)carbinol.

This carbinol is heated at about 120° C. (1 mm.) for seven hours to give the methyl ester of 4-(p-phenylbenzoylmethyleneimino)benzoic acid.

*Example 15*

A solution of 7.5 g. of biphenylyl-4-glyoxal in anhydrous ethanol is heated at 60° C. for 30 minutes. To the clear solution is added 2.8 g. of o-aminobenzoic acid in 20 cc. of ethanol and the solution refluxed for three hours. Cooling gives the ethyl ether of α-(p-phenylbenzoyl)-α-(2-carboxyphenylamino)carbinol.

This latter compound (0.8 g.) is heated in a desiccator pistol for 15 hours as described in Example 1 to give 2-(p-phenylbenzoylmethyleneimino)benzoic acid.

*Example 16*

4-glyoxalyldiphenylether hydrate (2.44 g.) is dissolved in 50 cc. of anhydrous ethyl alcohol by heating at 60° C. for 30 minutes. To this solution is added 1.38 g. of p-aminobenzoic acid dissolved in 25 cc. of ethanol. Heating is continued for two hours and then the solution is cooled slowly to yield the precipitate of the ethyl ether of α-(p-phenoxybenzoyl)-α-(4 - carboxyphenylamino)carbinol, M.P. 127–129° C.

This compound (4.16 g.) is heated as described in Example 1 for 10 hours at 0.1 mm. of mercury to yield 4-(p-phenoxybenzoylmethyleneimino)benzoic acid, M.P. 162–163° C.

*Example 17*

A solution of 2.5 g. of 4-glyoxalylstilbene hydrate in 50 cc. of anhydrous ethanol is heated at 60° C. for one hour and then to this solution of the ethylate thus formed is added a solution of 1.38 g. of p-aminobenzoic acid in 25 cc. of ethanol. Refluxing is continued for three hours. Cooling gives the ethyl ether of α-(p-styrylbenzoyl)-α-(4-carboxyphenylamino)-carbinol, M.P. 233–234° C.

This compound (4 g.) is heated as described in Example 1 at 100° C. and 5 mm. of mercury for 10 hours to give 4-(p-styrylbenzoylmethyleneimino)benzoic acid, M.P. 235° C.

*Example 18*

A solution of 22.4 g. of 4-acetyldiphenylethane is dissolved with heating in 200 cc. of glacial acetic acid and then cooled slowly. When the temperature is at 50° C., chlorine gas is bubbled into the mixture for one hour. The mixture is then poured into water-ice and extracted with methylene chloride. The dried extract is evaporated and the residue recrystallized from ethanol furnishes 4-dichloroacetyldiphenylethane, M.P. 51–52° C.

To a solution of 16 g. of 4-dichloroacetyldiphenylethane dissolved in 150 cc. of anhydrous methanol is added dropwise slowly a solution of 2.3 g. of sodium in 50 cc. of methanol. After two hours at 45–50° C. the sodium chloride which forms is filtered off and the filtrate evaporated. The residue is taken up in acetic acid at 50° C. and the acid solution, after treatment with charcoal, is heated at 60° C. for 15 minutes with 5 cc. of 3% sulfuric acid. To the cooled mixture is added water to complete the precipitation of 4-glyoxalyldiphenylethane hydrate, M.P. 119–121° C.

The latter compound (25.6 g.) is heated at 60° C. for 30 minutes with 500 cc. of anhydrous ethanol and then 13.8 g. of p-aminobenzoic acid in 200 cc. of ethanol is added. Heating is continued for three hours and then the mixture cooled to precipitate the ethyl ether of α-(p-phenethylbenzoyl) - α - (4-carboxyphenylamino)carbinol, M.P. 170° C. (dec.).

On the bottom of a transparent glass container is spread out a layer of 410 g. of the carbinol obtained as above, in such a way so that the thickness of the layer of product is not greater than 1 cm. The layer of product is illuminated with 375 watt lamps at a distance of 12–15 cm. The temperature of the layer is regulated between 120–130° C. by a resistance thermometer connected in series with the lamps. The irradiation is continued for 4–5 hours, after which a sample of product, qualitatively analyzed, indicates the absence of the ethoxyl group. There is thus obtained 4-(p-phenethylbenzoylmethyleneimino)benzoic acid, M.P. 180° C.

*Example 19*

5.6 g. of 4-glyoxalyldiphenylmethane hydrate (obtained by treatment of 4-dichloroacetyldiphenylmethane with sodium methylate in methanol and subsequent acid hydrolysis as described in Example 18) is dissolved with warming in 60 cc. of anhydrous methanol and to the clear solution is added 2.8 g. of p-aminobenzoic acid in 50 cc. of methanol. Heating is continued for three hours and then cooled to separate the methyl ether of α-(p-benzylbenzoyl)-α-(4-carboxyphenylamino)carbinol.

This compound (400 g.) is placed in a transparent container and irradiated with a beam of infrared rays as described in Example 18 to give 4-(p-benzylbenzoylmethyleneimino)benzoic acid.

*Example 20*

A solution of 5 g. of 4'-chlorophenoxyphenyl-4-glyoxal hydrate in 50 cc. of anhydrous isopropanol is treated with a solution of 2.8 g. of p-aminobenzoic acid in 60 cc. of isopropanol. The mixture is heated at 60° C. for four hours and then cooled to yield the isopropyl ether of α-(p-4-chlorophenoxybenzoyl)-α-(4 - carboxyphenylamino)carbinol.

This compound (100 g.) is irradiated as described in Example 18 to give 4-(p-4-chlorophenoxybenzoylmethyleneimino)benzoic acid.

*Example 21*

2.6 g. of diphenylsulfide-4-glyoxal hydrate is heated in 50 cc. of ethanol at 60° C. for 30 minutes and is then treated with 1.3 g. of p-aminobenzoic acid as described in Example 1. The ethyl ether of α-(p-phenylmercaptobenzoyl)-α-(4 - carboxyphenylamino)carbinol thus obtained (432 g.) is irradiated as described in Example 18 to give a quantitative yield of 4-(p-phenylmercaptobenzoylmethyleneimino)benzoic acid, M.P. 137° C.

*Example 22*

A solution of 2.92 g. of diphenylsulfone-4-glyoxal hydrate in 60 cc. of ethanol is heated at 60° C. for 30 minutes and then a solution of 1.6 g. of sodium p-aminobenzoate in 20 cc. of ethanol is added. Following the procedure described in Example 1 there is obtained the ethyl ether of sodium α-(p-phenylsulfonylbenzoyl)-α-(4-carboxyphenylamino)carbinol.

This compound (980 mg.) is heated at 120° C. and 0.5 mm. of mercury to yield sodium 4-(p-phenylsulfonylbenzoylmethyleneimino)benzoate.

Similarly, employing the free p-aminobenzoic acid above yields the corresponding 4-(p-phenylsulfonylbenzoylmethyleneimino)benzoic acid.

*Example 23*

2.76 g. of 4-glyoxalyldiphenylsulfoxide hydrate is heated at 60° C. for two hours in dioxane and the solution treated with 1.38 g. of o-aminobenzoic acid in 25 cc. of dioxane as described in Example 15 to yield α-(p-phenylsulfinyl-benzoyl)-α-(2-carboxyphenylamino)carbinol.

The carbinol thus obtained (1 g.) is heated at 100° C./0.1 mm. mercury until constant weight to give 2-(p-phenylsulfinylbenzoylmethyleneimino)benzoic acid.

*Example 24*

To a heated solution of 2.44 g. of diphenylether-3-glyoxal hydrate in 50 cc. of anhydrous methanol is added 1.58 g. of methyl p-aminobenzoate in 20 cc. of methanol. Heating is continued at 60° C. for three hours and the mixture worked up as described in Example 1 to give the methyl ether of α-(m-phenoxybenzoyl)-α-(4-carbomethoxyphenylamino)carbinol.

This compound (416 g.) is subjected to the action of a beam of infrared rays according to the description given in Example 18 to give methyl 4-(m-phenoxybenzoylmethyleneimino)-benzoate.

*Example 25*

3.1 g. of α,β-diethyldiphenylethane-4-glyoxal hydrate (obtained by treatment of the corresponding 4-dichloroacetyl-α,β-diethyldiphenylethane with sodium methylate and subsequent acid hydrolysis as described in Example 18) is heated at 60° C. for 30 minutes with 50 cc. of anhydrous ethanol. To the solution is added 1.38 g. of p-aminobenzoic acid in 20 cc. of ethanol and heating is continued for three hours. Cooling precipitates the ethyl ether of α-[p-(α,β-diethylphenethyl)-benzoyl]-α-(4-carboxyphenylamino)carbinol.

Subjecting the compound thus obtained to the action of a beam of infrared rays according to the method given in Example 18 results in the elimination of a molecule of alcohol and the formation of the corresponding methyleneimino derivative in quantitative yield.

This application is a continuation-in-part of application Serial No. 40,577, filed on July 5, 1960, now abandoned.

What is claimed is:

1. A chemical compound selected from the group consisting of compounds having the following structural formulas:

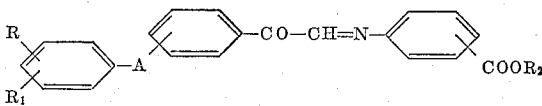

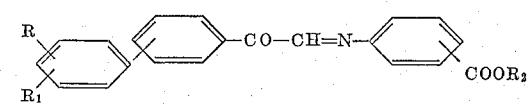

in which R is a member selected from the group consisting of hydrogen, halogen, hydroxy, lower alkoxy of from 1 to 4 carbon atoms, lower alkyl of from 1 to 4 carbon atoms and benzyloxy; $R_1$ is a member selected from the group consisting of hydrogen and halogen; $R_2$ is a member selected from the group consisting of hydrogen and lower alkyl of from 1 to 4 carbon atoms; and A is a member selected from the group consisting of oxygen, sulfur, sulfonyl, sulfinyl, methylene, ethylene, α,β-diethylethylene, vinylene and α,β-diethylvinylene.

2. A chemical compound having the following structural formula:

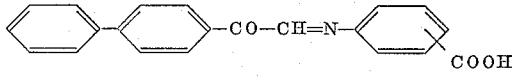

3. 4-(p-phenylbenzoylmethyleneimino)benzoic acid.
4. 4-(o-phenylbenzoylmethyleneimino)benzoic acid.
5. 4-(p-phenoxybenzoylmethyleneimino)benzoic acid.
6. 4 - (p-3-chloro-4-methoxyphenylbenzoylmethyleneimino)benzoic acid.
7. 4 - (p - 4 - hydroxyphenylbenzoylmethyleneimino)benzoic acid.

8. The method of preparing novel benzoylmethyleneiminobenzoic acid derivatives selected from the group consisting of compounds having the following structural formulas:

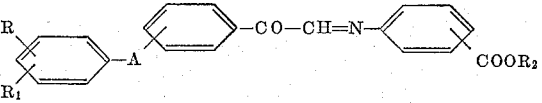

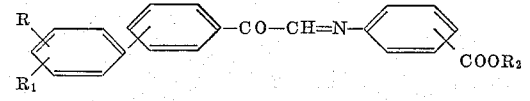

in which R is a member selected from the group consisting of hydrogen, halogen, hydroxy, lower alkoxy of from 1 to 4 carbon atoms, lower alkyl of from 1 to 4 carbon atoms and benzyloxy; $R_1$ is a member selected from the group consisting of hydrogen and halogen; $R_2$ is a member selected from the group consisting of hydrogen and lower alkyl of from 1 to 4 carbon atoms; and A is a member selected from the group consisting of oxygen, sulfur, sulfonyl, sulfinyl, methylene, ethylene, α,β-diethylethylene, vinylene and α,β-diethylvinylene which comprises decomposing by heating in the absence of a catalyst an α-benzoyl-α-arylaminocarbinol derivative selected from the group consisting of compounds having the following formulas:

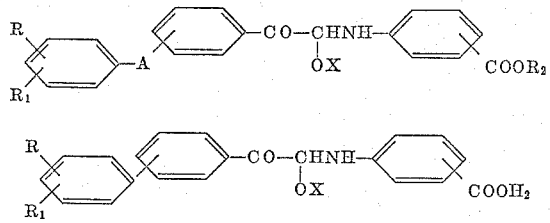

in which R, $R_1$, $R_2$ and A are as defined above and X is a member selected from the group consisting of hydrogen and lower alkyl of from 1 to 4 carbon atoms, to eliminate one molecule of water when X is hydrogen and to eliminate one molecule of alcohol when X is lower alkyl of from 1 to 4 carbon atoms.

9. The method of claim 8 characterized in that the decomposition is carried out by heating in the absence of a catalyst the carbinol derivative to a temperature of from about 70 to 140° C. at a pressure of from about 0.01–15 mm. of mercury.

10. The method of claim 8 characterized in that the decomposition is carried out by heating in the absence of a catalyst the carbinol derivative with a beam of infrared rays to a temperature of from about 100–150° C. at atmospheric pressure.

References Cited in the file of this patent
UNITED STATES PATENTS
2,577,209    Rios _____ Dec. 4, 1951

OTHER REFERENCES

Musante et al.: Chemical Abstracts, vol. 46, page 4502 (1952).

Wagner et al.: Synthetic Organic Chemistry, page 32 (1953).